United States Patent [19]
Shuster et al.

[11] Patent Number: 5,195,240
[45] Date of Patent: Mar. 23, 1993

[54] METHOD FOR THE MANUFACTURE OF THERMOPLASTIC PANEL HEAT EXCHANGERS

[75] Inventors: Jerry P. Shuster, Oakville, Canada; Anthony J. Cesaroni, 9 Heathmore Court, Unionville, Ontario, Canada, L3R 8J1

[73] Assignees: Du Pont Canada Inc., Mississauga; Anthony J. Cesaroni, Unionville, both of Canada

[21] Appl. No.: 869,161

[22] Filed: Apr. 16, 1992

Related U.S. Application Data

[63] Continuation-in-part of Ser. No. 642,391, Jan. 11, 1991, abandoned, which is a continuation-in-part of Ser. No. 335,573, Apr. 10, 1989, abandoned.

[30] Foreign Application Priority Data

Apr. 15, 1988 [GB] United Kingdom ............... 88.08944

[51] Int. Cl.$^5$ ..................... F29C 51/10; F29C 51/12
[52] U.S. Cl. ............................. 29/890.039; 29/421.1; 156/228; 156/245; 156/285; 156/290; 156/292; 264/85; 264/512; 264/516; 264/545
[58] Field of Search ............... 264/85, 545, 516, 512, 264/514, 526, 529; 126/444, 445; 165/905, 46, 170; 156/228, 292, 245, 156, 285, 290, 286, 308.6; 29/890.39, 890.044, 421.1

[56] References Cited

U.S. PATENT DOCUMENTS

| | | | |
|---|---|---|---|
| 3,935,358 | 1/1976 | Wyeth et al. | 428/166 |
| 4,287,876 | 9/1981 | Jacques | 126/426 |
| 4,411,310 | 10/1983 | Perry et al. | 165/166 |
| 4,457,797 | 7/1984 | Hatchadoorian et al. | 156/242 |
| 4,859,265 | 8/1989 | Shuster et al. | 156/292 |
| 4,876,127 | 10/1989 | Khanna et al. | 428/35.7 |

FOREIGN PATENT DOCUMENTS

| | | |
|---|---|---|
| 0286399 | 6/1988 | European Pat. Off. |
| 0286400 | 10/1988 | European Pat. Off. |
| 0287271 | 10/1988 | European Pat. Off. |
| 0304261 | 2/1989 | European Pat. Off. |
| 1952785 | 4/1971 | Fed. Rep. of Germany |
| 2622499 | 12/1976 | Fed. Rep. of Germany |
| 2566107 | 12/1985 | France |
| 60-125633 | 12/1983 | Japan |
| 1072520 | 9/1984 | Japan |
| 1465564 | 2/1977 | United Kingdom |
| 1487440 | 9/1977 | United Kingdom |

Primary Examiner—Jan H. Silbaugh
Assistant Examiner—Catherine Timm

[57] ABSTRACT

A method for the manufacture of panel heat exchangers from thermoplastic polyamides. At least one sheet is coated with a coating that facilitates bonding of the polymer to itself under the influence of heat. Two sheets, at least one of which has been coated, are placed between moulds in a press. At least one of the moulds has grooves corresponding to the pattern of fluid flow passages to provided in the panel heat exchanger. The moulds are heated and an inert gas e.g. nitrogen, is applied and passed through the fluid flow passages, to assist in the formation of the passages and to remove any voltatile material from the coating. The preferred coating is benzyl alcohol, phenol and polyamide. The heat exchangers may be used in a variety of end-uses, especially in automotive end-uses.

10 Claims, 2 Drawing Sheets

METHOD FOR THE MANUFACTURE OF THERMOPLASTIC PANEL HEAT EXCHANGERS

RELATED PATENT APPLICATION

This patent application is a continuation-in-part of our patent application Ser. No. 07/642 391, filed Jan. 11, 1991 (now abandoned), which was a continuation-in-part of application Ser. No. 07/335,573, filed Apr. 10, 1989 (now abandoned).

BACKGROUND OF THE INVENTION

1. Field Of the Invention

The present invention relates to a method for the manufacture of thermoplastic panel heat exchangers, especially a method for the manufacture of thermoplastic panel heat exchangers having inlet and outlet header means, and to the resultant panel heat exchangers, in which the thermoplastic polymer is a polyamide.

2. Description of the Prior Art

Panel heat exchangers are known and, in operation, are characterized by passage of air over the relatively planar surface of that type of heat exchanger. It has been traditional to fabricate heat exchangers, including panel heat exchangers, from a heat conductive metal e.g. aluminum. However, it is difficult to form metals, including aluminum, in an economical manner into thin, light weight, structures having adequate strength.

Panel heat exchangers manufactured from thermoplastic polymers, and methods for the manufacture of such heat exchangers, are disclosed in European patent applications Nos. 0 286 399 and 0 286 400 of A. J. Cesaroni and J. P. Shuster, published Oct. 12, 1988; No. 0 287 271 of A. J. Cesaroni, published Oct. 19, 1988; and No. 0 304 261 of A. J. Cesaroni, published Feb. 22, 1989. The above patent applications disclose methods for the manufacture of thermoplastic panel heat exchangers, including header means to permit the flow of liquid into and out of the heat exchanger.

SUMMARY OF THE INVENTION

An improved method for the manufacture of a thermoplastic panel heat exchanger having header means has now been found.

Accordingly, the present invention provides a method for the manufacture of a panel heat exchanger from a thermoplastic polyamide, said heat exchanger consisting essentially of first and second panels and inlet and outlet header means with said panels being bonded together to define fluid flow passages extending between the inlet and outlet header means, each of said panels being generally planar and formed from sheet of said polyamide having a thickness of less than 0.7 mm, said panels having orifices therein cooperatively located at each of the inlet and outlet header means, each of said inlet and outlet header means being comprised of a distributor having planar ends, an axial flow passage and at least one radial flow passage, said method consisting essentially of the sequential steps of:

(a) placing the two sheets of thermoplastic polyamide, at least one of which has been coated with a coating composition that will facilitate bonding of the sheets under the influence of heat, in face-to-face contact between moulds in a heated press, said coating being comprised of benzyl alcohol, each of said moulds being at a temperature in the range of 140°-200° C. and the surfaces of at least one of said moulds having a recessed pattern thereon corresponding to the fluid flow passages of the panel heat exchanger, such that (i) the sheets are in face-to-face contact with each other and additionally in face-to-face contact with opposite ends of said distributors over substantially the entire face of the sheets, the distributors being in a spaced apart relationship corresponding to the location thereof in the panel heat exchanger, and (ii) the coating is at the interface between the sheets; and (b) heating and pressing said moulds to effect bonding between the sheets and between the sheets and the ends of the distributors and applying an inert gas between said inlet and outlet header means, said inert gas being applied for at least two cycles of (i) flushing the gas between the inlet and outlet header means and (ii) increasing the gas pressure to 1.3–2.75 MPa, thereby bonding said sheets together whilst forming fluid flow passages between the inlet and outlet header means and removing volatile matter from the fluid flow passages.

In preferred embodiments of the method of the invention, the coating composition is applied to the ends of the distributors.

In further embodiments, the distributors have at least two radial orifices.

DETAILED DESCRIPTION OF THE INVENTION

The present invention will be described with particular reference to the drawings in which.

Figure 1:
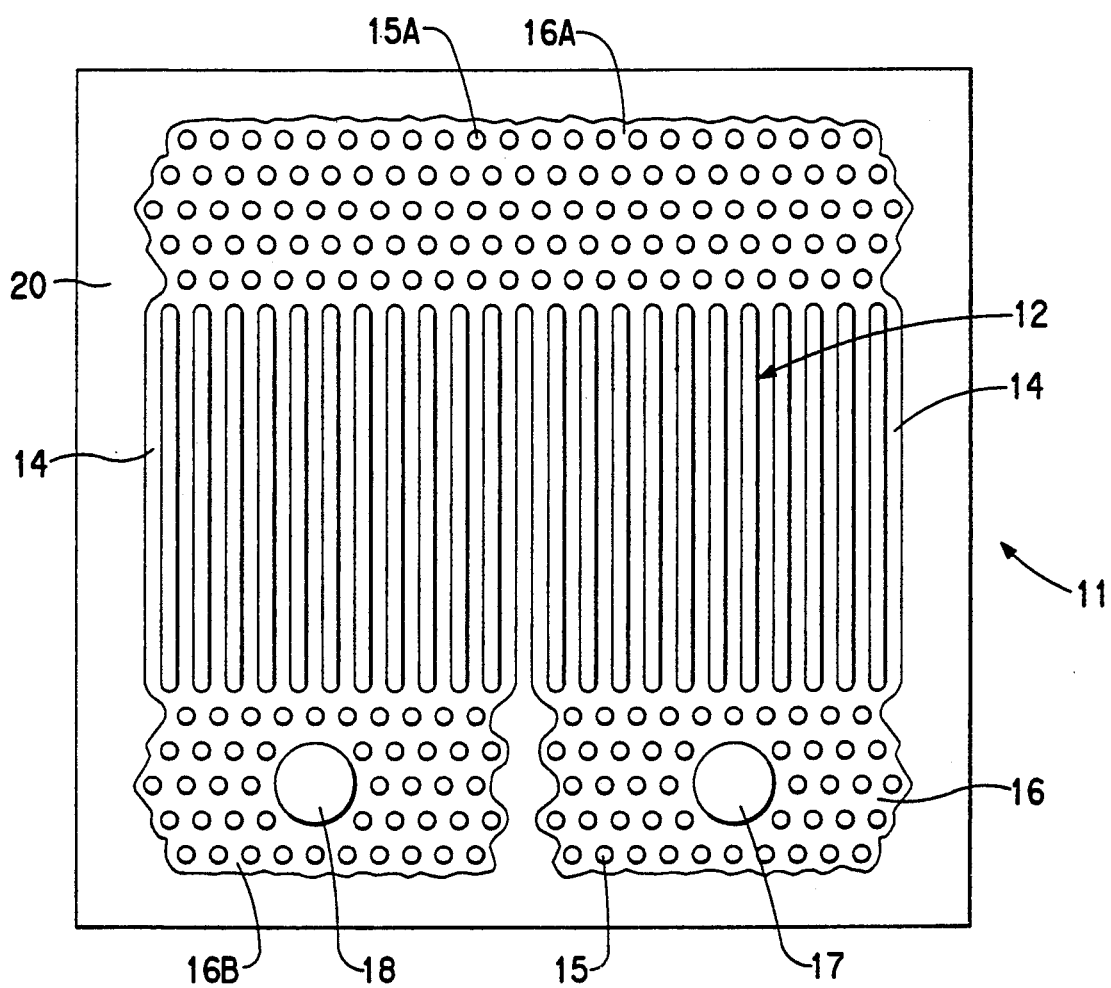
FIG. 1 is a plan view of a heat exchanger panel.

FIG. 1 shows a panel, generally indicated by 11, of a heat exchanger; in the embodiment shown, the panel has a labyrinth 12 of fluid flow passages therein. Panel 11 also has a sealed edge 20 extending completely around panel 11, which forms the edge seal of the heat exchanger. The labyrinth 12 on panel 11 is an example of flow fluid passages that may be provided in a panel heat exchanger between the inlet and outlet means, in this instance from inlet orifice 17 through space 16 surrounding sealed sections 15 through channels 14 to the opposing end of the panel heat exchanger, through further space 16A surrounding sealed sections 15A and back through the remainder of channels 14, through space 16B and to outlet orifice 18. Header means are provided at inlet orifice 17 and outlet orifice 18.

Figure 2:
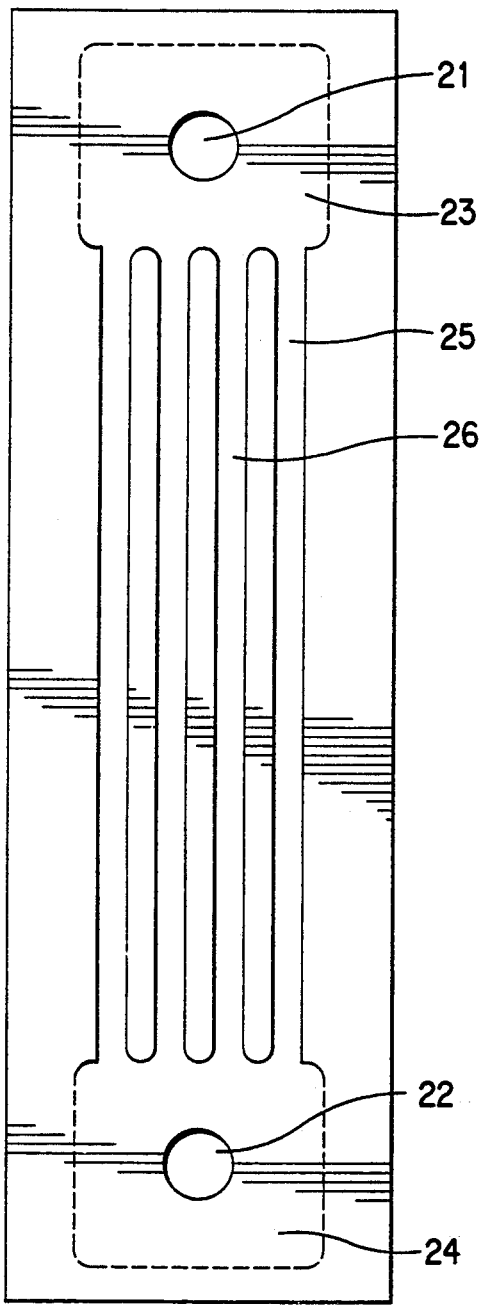
FIGS. 2 and 3 are plan views of alternate embodiments of heat exchanger panels.

FIG. 2 is an alternate embodiment of a heat exchanger panel. In this embodiment, orifices 21 and 23 of the inlet and outlet header means, generally indicated by 22 and 24, are located at opposite ends of the heat exchanger panel, which in the embodiment shown is elongated. Such an elongated heat exchanger panel is particularly adapted to be located in, for instance, the radiator of an automobile.

In FIG. 2, the inlet and outlet header means 22 and 24 are connected by a series of substantially linear fluid flow passages 25 that are interspaced with similarly elongated sections 26 in which the panels of the heat exchanger are sealed together; in embodiments, the linear fluid flow passages 25 have a width of less than 12.5 mm and especially in the range of 1.2–2.5 mm. In the alternate embodiment of FIG. 3, the inlet and outlet header means 23 and 24 are connected by non-linear fluid-flow passages that are formed as channels 27 between isolated sealed sections 28 that, in the embodiment shown, are substantially circular in shape. The sealed sections 28 may be located in the heat exchanger panel in any desired pattern, but usually in a systematic pattern. The optimum pattern may depend in part on the fluid that is to be passed through the heat exchanger. For instance, some fluids e.g. water may be less susceptible to laminar flow in the heat exchanger than other fluids e.g. oil. The latter may require a fluid flow passage that is intended to cause a greater degree of turbulence in the flow than that required for other fluids e.g. water.

Sealed sections 28 have been described above as being circular in shape. However, other shapes may be used e.g. diamond, hexagonal, ovate, rectangular, herring bone patterns or the like.

In embodiments of the invention, means are provided in the panel to cause turbulence in the fluid. The means to cause turbulence may be on the external surface, in order to cause turbulence in fluid e.g. air or liquid, passing over the surface of the panel heat exchanger. Means to cause turbulence may also be provided on the inner surface of the panel, to cause turbulence in fluid passing through the heat exchanger. Such means may be more beneficial when the liquid passing through the heat exchanger is relatively viscous e.g. for oil rather than water. The means may be indentations, projections or the like that extend into the space through which fluid is intended to flow through the heat exchanger, and thereby cause turbulence in the fluid passing through the heat exchanger. Such means may be designed into the recessed pattern on the moulds so that indentations, projections or the like are formed during the fabrication of the heat exchanger.

Embodiments of the inlet and outlet header means are described in greater detail in the aforementioned European patent application No. 0 304 261 of A. J. Cesaroni, but other inlet and outlet header means may be used.

The panel heat exchanger of the present invention may be assembled without the use of gaskets or the like, or using one or more of gaskets or the like.

The invention has been described above with reference to a single panel heat exchanger. However, in preferred embodiments a plurality of heat exchangers may be used, the heat exchangers being arranged in parallel or more likely in series. In such event, the inlet and outlet header means, may be modified to accommodate a plurality of heat exchangers e.g. a stack of heat exchangers, and parallel or series flow of fluid through the heat exchangers, as described in European patent application No. 0 304 261. It may be preferable to use spacers between the individual heat exchangers of a stack of heat exchangers; such spacers may be fabricated separately from the parts of the headers or fabricated as part thereof.

In the process of the present invention, at least one sheet that will form the panel of the heat exchanger is coated with a coating composition that will facilitate the bonding of the panels under the influence of heat; examples of coatings are given below but the coating should contain benzyl alcohol, as it is believed that benzyl alcohol is important to operation of the process at temperatures that are substantially below the melting point of the polymer. Coating of both sheets is preferred. In embodiments, the coating not only facilitates bonding between the opposing panels but also tends to soften the polymer in the regions where bonding does not occur and, on application of heated inert gas, facilitates the forming of the fluid-flow passages; the inert gas tends to remove any volatile matter in the coating.

The sheets are formed from a polyamide, and the coating must facilitate the bonding of polyamide sheets. Although the sheet may be coated in a pattern corresponding to the pattern of the bonding of the sheets in the fabrication of the exchanger, it will normally be most convenient and preferred that the entire surface of the sheet be coated.

In a preferred embodiment, the coating is a homogeneous admixture of benzyl alcohol, phenol and polyamide, as is disclosed in the European patent publication No. 0 287 271. Examples of alternative coatings are disclosed in European patent publication No. 0 286 400. An alternate preferred coating is a homogeneous mixture of benzyl alcohol, phenol and methanol, especially in the ratio of about 12/80/8 by weight, as is disclosed in European patent publication No. 0 287 271. In another embodiment, the coating is a mixture of trifluoroethanol and benzyl alcohol, especially in a ratio of about 80:20 by weight.

In the fabrication of the heat exchanger, the coated sheets of the first panel and of the second panel are brought into contact in a face-to-face manner, between the moulds of a press, with the coating at the interface between the sheets. The sheets are placed in face-to-face contact with each other and with the opposite ends of the distributors over substantially the entire face of the sheets. The moulds have grooves corresponding to the labyrinth of passages to be formed in the panels, and a groove to accommodate the part of the panels corresponding to the location of the distributor i.e. the location of the inlet and outlet header means.

The moulds of the press are heated to a temperature that is substantially below the melting point of the polyamide i.e. so that the polyamide does not melt, in contrast to blow-moulding and other parison forming processes. In particular, the moulds are heated to a temperature in the range of 140°-200° C., and especially in the range of 150°-180° C. The temperature depends in part on the polyamide, on the nature of the mould i.e. the shape and detail in the grooves, and the pressure of the gas applied to the process. As a consequence of the use of such temperatures, the panels have sufficient stiffness to permit direct removal from the mould without the need for a cooling step; this has benefits in terms of cycle time and energy requirements. The bonding between sheets and between sheets and distributors is carried out under heat and pressure, applied by the press.

In one embodiment of the process, a distributor, which may be for example a manifold but is preferably in the form of a distributor ring, is inserted between the first and second panel, at the location of the inlet and outlet header means. The ends of the distributor will normally be coated with the coating composition. On heating of the panels, under pressure, bonding is effected between the two panels and between the panels and the distributor, thereby locating the distributor between the panels at the locations of the inlet and outlet header means, preferably in a fluid tight seal.

In another embodiment of the process, the inlet and outlet header means are formed to the required shape by use of a distributor spacer, the distributor spacer being formed from a metal or other material that will not bond to the first and second sheet under the influence of heat and pressure. The first sheet is then partially bonded to the second sheet, using heat and pressure, but in such a manner that the distributor spacer may be removed from between the sheets by mechanical means and the distributor inserted. Subsequently the bonding of sheets and distributor ring is completed.

A gas, usually an inert gas e.g. nitrogen, is flushed between the sheets e.g. through the distributor ring at a pressure above atmospheric pressure. The gas is applied in cycles of flushing the inert gas between the inlet and outlet header means and increasing the pressure to a pressure in the range of 1.3–2.75 MPa, especially 1.5–2.5 MPa; the pressure used depends in part on the temperature of the moulds, in that at higher temperatures lower pressures may be used. The gas is provided under pressure so as to cause the fluid flow passages to form and flushed to remove volatile matter from the fluid flow passages; the two sections of the mould may be slowly moved apart after the polymer of the sheets has been heated so as to assist in the forming of the fluid flow passages. The flushing tends to remove any volatile components of the coating, for example when the coating is a composition of benzyl alcohol, phenol and polyamide, as disclosed in the aforementioned European patent publication No. 0 287 271. As noted above, the gas is alternately flushed through the panel and the gas pressure is increased to inflate the fluid flow passages and thus conform the polymer to the grooves in the mould; at least two cycles of flushing and inflation are preferably used e.g. in the range of 2–10 cycles and especially in the range of 4–6 cycles. Subsequently, prior to removal of the panels thus formed from the moulds and with gas pressure still being applied, the temperature of the panels should be increased to above the expected operating temperature of the resultant heat exchanger, in order to reduce distortion of the channels during use of the heat exchanger.

The panels of the heat exchanger require orifices at the location of the inlet and outlet header means. Such orifices may be provided in the sheets before the sheets are placed between the platens; such orifices are preferably cut from the sheets after any coating of the sheets. Alternatively, the orifices may be cut from the panels after forming e.g. by use of a trimming knife, hot wire or other hot tool.

The mould is attached, preferably in a detachable manner, to a press platen, thereby facilitating expeditious changing of the pattern of the grooves in the panel. One or both surfaces of the platen surface that contact the sheet may have the pattern of grooves therein.

The particular polyamide selected for the sheets will depend primarily on the end use intended for the heat exchanger, especially the temperature of use and the environment of use, including the fluid that will be passed through the heat exchanger and the fluid e.g. air or liquid, external to the heat exchanger. In the case of use on a vehicle with air as the external fluid, the air may at times contain salt or other corrosive or abrasive matter. The nature of the polyamide composition used to form the sheets that become the panels of the heat exchanger may affect the efficiency of the heat exchanger, as it is believed that heat is capable of being dissipated from the heat exchanger by at least both convection and radiation. The polyamide may contain stabilizers, pigments, fillers and other additives known for use in polymer compositions.

Examples of such polyamides are the polyamides formed by the condensation polymerization of an aromatic or aliphatic dicarboxylic acid having 6–12 carbon atoms with an aliphatic primary diamine having 6–12 carbon atoms. Alternatively, the polyamide may be formed by condensation polymerization of an aliphatic lactam or alpha,omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,12-dodecanedioic acid and terephthalic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid and amino dodecanoic acid. Preferred examples of the polyamides are polyhexamethylene adipamide and polycaprolactam, which are also known as nylon 66 and nylon 6, respectively. In preferred embodiments, the polymer is a polyamide that has been filled with glass-fibre, especially such a polymer that is a toughened polyamide e.g. toughened by addition of polymers having elastomeric or rubbery properties.

The polymer of the distributor may be similar to that of the panels. However, different polymers may be used, provided that such polymers may be bonded to the polymers of the panels and/or coating on the panel, whichever contacts the distributor. Nonetheless, in preferred embodiments the distributor is fabricated from a so-called engineering polymer, especially a polyamide of the type discussed above.

Some sheets may exhibit shrinkage in the methods of the present invention, depending on the method of manufacture, and the amount of shrinkage may vary even within the same polyamide composition. Thus the areas of the inlet and outlet header means viz. 21–24 in FIGS. 2 and 3, may need to be designed with some flexibility in positioning of the inlet and outlet header means, especially during the method of manufacture.

Laminated or coated materials may often be utilized with advantage in the fabrication of the panels, provided that the laminated or coated materials are capable of being formed into panels using the method disclosed herein. Such materials could comprise a layer providing the necessary physical resistance and inner and/or outer layers to provide resistance to the working fluids or contaminants. An example of the laminated materials is a layer of glass or other fibre in the form of a fabric, laminated between layers of polyamide. Composite materials may also be used e.g. glass-filled and fibre-filled composites.

In embodiments in which the polymer is polyamide and each sheet is coated with the aforementioned benzyl alcohol/phenol/polyamide or benzyl alcohol/phenol/methanol composition, then it may be advantageous to insert a film of a polyamide between the first and second sheets. Such a film becomes bonded to the coating and loses its integrity but it has been observed that the use of such a film may result in the production of a panel heat exchanger of more uniform properties.

The panel heat exchangers formed by the method of the present invention have wall thicknesses, at least in those portions where transfer of heat will occur, of less than 0.7 mm, and especially in the range of 0.07–0.50 mm, particularly 0.12–0.30 mm. At such wall thicknesses, the transmission of heat through the wall becomes substantially independent of wall thickness, and thus wall thickness becomes a relatively minor or insignificant factor in the operating effectiveness of the heat exchanger. It is to be understood, however, that the polymer composition and the wall thickness must be selected so that the resultant heat exchanger will have the necessary physical properties to be acceptable for the intended end use.

In cold weather, especially below about −15° C., oil tends to become very viscous. On starting a motor under such conditions, the oil pressure may be substantially above normal operating pressures. In order to reduce the possibility of damage to the heat exchangers of the present invention under such circumstances, the heat exchangers may be equipped with a by-pass system so that cold viscous oil passes from the inlet to the outlet without passing through the fluid flow passages. This may be accomplished using a heat activated by-pass valve that passes cold oil through alternate passages in the heat exchanger that go directly from inlet to oulet until such time as the oil reaches a predetermined temperature at which time the valve directs the oil through the fluid flow passages of the heat exchanger.

The process of the present invention provides a versatile and relatively simple method of fabricating heat exchangers from polyamides.

The heat exchangers may be used in a variety of end uses, depending on the polymer from which the heat exchanger has been fabricated and the intended environment of use of the heat exchanger. In particular, heat exchangers of the invention may be inserted into the so-called end-tanks of radiators of automobiles or similar vehicles, and used for the cooling of transmission oil. However, while the panel heat exchangers have been described with particular reference to use in automotive end-uses, it is to be understood that the panel heat exchangers fabricated by the process of the present invention may be used in a wide variety of end-uses. Examples of other uses include refrigeration, industrial heating and cooling, solar heating, and medical and consumer end-uses e.g. heating and/or cooling of beds, chairs and car seats.

The present invention is illustrated by the following examples:

EXAMPLE I

Figure 3:
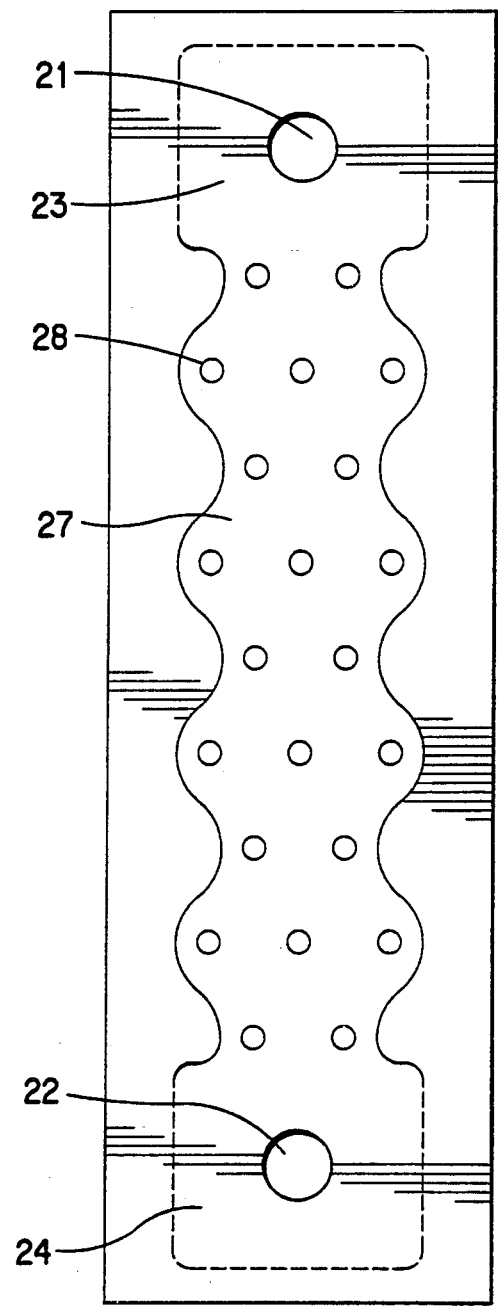

A series of panel heat exhangers were formed from polyamide sheet using the method described above. The coating was a solution of benzyl alcohol, phenol and polyamide, which was applied to one of the two sheets placed between the moulds. The polyamide sheets had thicknesses of either 0.25 mm (10 mil) or 0.37 mm (15 mil). In addition, the panel heat exchangers had either a pattern of fluid flow passages as shown in FIG. 2 i.e. linear passages, or as shown in FIG. 3 i.e. a labyrinth of passages. The panel heat exchangers were of approximately the same dimensions vis. 27×4.5 cm.

Oil having a specific heat of 0.523 was passed through the panel heat exchangers at a rate of 2.23 from the panel heat exchanger was measured. Water was passed over the panel heat exchanger at a rate of about 9 kg/min.

Further experimental details and the results obtained were as follows:

TABLE I

| Run No.* | 1 | 2 | 3 | 4 |
|---|---|---|---|---|
| Sheet thickness (mm) | 0.37 | 0.25 | 0.37 | 0.37 |

TABLE I-continued

| Run No.* | 1 | 2 | 3 | 4 |
|---|---|---|---|---|
| Oil temperature (°C.) | | | | |
| In | 260.9 | 259.2 | 257.5 | 253.6 |
| Out | 236.6 | 233.5 | 218.4 | 185.6 |
| Water temperature (°C.) | 46 | 47 | 46 | 46 |
| Cooling Rate** | 62 | 66 | 101 | 169 |

*Runs 1 and 2 used heat exchangers having the pattern of FIG. 2, and Run 3 used a heat exchanger having a pattern of FIG. 3. Run 4 is a comparative run using a commercial metal heat exchanger of similar dimension to the heat exchangers of Runs 1-3
**The cooling rate is based on the difference in temperatures of the oil at the inlet and outlet of the heat exchanger, and is a measure of the effectiveness of the heat exchanger.

This example illustrates use of panels made by the process of the present invention in the cooling of oil.

EXAMPLE II

A plurality of tests were performed to determine the effects of a number of process variables on the manufacture of panels according to the method of the present invention. The panels were made from sheets of a toughened polyhexamethylene adipamide composition having a thickness of approximately 0.19 mm (7.5 mil). The adhesive used was an admixture of benzyl alcohol, phenol and methanol and was coated onto the sheets using either a blade (20 mil piece of film) or a hand roller. Both samples of sheet used in each test were coated on one side; the coated sides were brought into face-to-face contact and the resultant sandwich passed between moulds in a press.

Both moulds of the press had a pattern of grooves thereon corresponding to the pattern of fluid flow passages in the panel. The grooves were linear grooves of different shapes in different tests. The moulds were maintained at a constant temperature. The sheets were pressed (approximately 30 tonnes pressure applied) between the moulds for about 20–30 seconds, during which time the gas (nitrogen) pressure was cycled by alternately flushing the gas through the fluid flow passages and then increasing the pressure to conform the polymer to the shape of the mould.

It was found that if insufficient adhesive was used, the bonds formed between the sheets were weak whereas an excess resulted in burning through of the polymer and hence pinholes in the panel. For optimum performance, an even coating was required.

A summary of the results obtained is given in Table II.

TABLE II

| Mould Design | Mould Temp.(°C.) Range | Mould Temp.(°C.) Pref. | Gas Pressure (MPa) Range | Gas Pressure (MPa) Pref. | Cycles |
|---|---|---|---|---|---|
| A | 149–177 | 163 | 1.03–1.89 | 1.72 | 4–5 |
| B | 149–177 | 163 | 1.21–1.89 | 1.89 | 5–6 |
| C | 149–182 | 166 | 1.38–2.07 | 1.89 | 4–5 |
| D | 149–182 | 166 | 1.72–2.20 | 2.07 | 5–6 |
| E | 149–182 | 174 | 1.72–2.34 | 2.34 | 4–5 |
| F | 149–182 | 163 | 1.72–2.20 | 2.20 | 4–5 |

Note:
A = round tubes, sheets approximately 25 × 7.5 mm
B = round tubes with external pimples, sheets approximately 25 × 7.5 mm
C = square tubes, sheets approximately 25 × 7.5 mm
D = square tubes with external pimples, sheets approximately 25 × 7.5 mm
E = square tubes, sheets approximately 65 × 15 mm
F = rectangular tubes with external pimples, sheets approximately 50 × 10 mm
"Range" = range tested; "Pref." = a preferred value based on the tests conducted These results represent tests run with a particular apparatus. It is apparent that the preferred operating conditions depend on the design of the mould e.g. the shape of the fluid flow passages, the size of the sheet being moulded, the temperature used and the gas pressure used. The preferred number of cycles of flushing and inflation used in the manufacture of each panel was generally in the range of 4–6.

The mould design A was the easiest to form, which is reflected in the low preferred gas pressure. Higher pressures were required for the formation of the pimples on the external surface of the panel (mould design B) and for the formation of the square corners on the square tubes (mould design C); mould design D having both of these characteristics required an even higher gas pressure.

If the pressure used on the mould i.e. the pressure exerted by the press, was too low, the gas leaked around the perimeter of the mould, thereby causing poor formation of the fluid flow passages as well as weak bonds between the sheets. If the pressure was too high, the sheets were sometimes displaced relative to each other, causing tears or pinholes. If the gas pressure was too low, there was poor formation of the fluid flow passages and ineffective purging of the adhesive from within the panels. Too high a gas pressure sometimes results in formation of pinholes or tears. If the number of cycles used was too low, poor formation of fluid flow passages could result or the purging of the adhesive was insufficient with the result that fluid flow passages could become blocked through additional bonding within the passages or pinholing of the polymer due to the presence of the adhesive. Too many cycles had little additional affect.

We claim:

1. A method for the manufacture of a panel heat exchanger from a thermoplastic polyamide, said heat exchanger consisting essentially of first and second panels and inlet and outlet header means with said panels being bonded together to define fluid flow passages extending between the inlet and outlet header means, each of said panels being generally planar and formed from a sheet of said polyamide having a thickness of less than 0.7 mm, said panels having orifices therein cooperatively located at each of the inlet and outlet header means, each of said inlet and outlet header means being comprised of a distributor having planar ends, an axial flow passage and at least one radial flow passage, said method consisting essentially of the sequential steps of:

(a) placing the two sheets of thermoplastic polyamide, at least one of which has been coated with a coating composition that will facilitate bonding of the sheets under the influence of heat, in face-to-face contact between moulds in a heated press, said coating being comprised of benzyl alcohol, each of said moulds being heated to a temperature in the range of 140°–200° C. and the surfaces of at least one of said moulds having a recessed pattern thereon corresponding to the fluid flow passages of the panel heat exchanger, such that (i) the sheets are in face-to-face contact with each other over substantially the entire face of the sheets and additionally in face-to-face contact with opposite ends of said distributors, the distributors being in a spaced apart relationship corresponding to the location thereof in the panel heat exchanger, and (ii) the coating is at the interface between the sheets; and (b) pressing said heated moulds to effect bonding between the sheets and between the sheets and the ends of the distributors and applying an inert gas between said inlet and outlet header means, said inert gas being applied for at least two cycles of (i) flushing the gas between the inlet and outlet header means and (ii) increasing the gas pressure to 1.3–2.75 MPa, thereby bonding said sheets together whilst forming fluid flow passages between the inlet and outlet header means and removing volatile matter from the fluid flow passages.

2. The method of claim 1 in which the coating composition is also applied to the ends of the distributors.

3. The method of claim 1 in which the distributors have at least two radial orifices.

4. The method of claim 1 in which the gas is nitrogen.

5. The method of claim 1 in which the polyamide is polyhexamethylene adipamide.

6. The method of claim 5 in which the temperature of said mould is in the range of 150°–180° C.

7. The method of claim 6 in which the pressure of inert gas is in the range of 1.5–2.5 MPa.

8. The method of claim 1 in which the panel heat exchanger has linear fluid flow passages with a width in the range of 1.2–2.5 mm.

9. The method of claim 1 in which the coating composition is an admixture of benzyl alcohol, phenol and methanol.

10. The method of claim 1 in which the gas is applied for 4–6 cycles.

* * * * *